(12) United States Patent
Peng

(10) Patent No.: US 11,200,220 B2
(45) Date of Patent: Dec. 14, 2021

(54) EFFICIENT STORAGE OF USER PERSONAL ATTRIBUTES FOR SERVICE PROVISIONING

(71) Applicant: Advanced New Technologies Co., Ltd., Grand Cayman (KY)

(72) Inventor: Jie Peng, Hangzhou (CN)

(73) Assignee: Advanced New Technologies Co., Ltd., Grand Cayman (KY)

( * ) Notice: Subject to any disclaimer, the term of this patent is extended or adjusted under 35 U.S.C. 154(b) by 287 days.

(21) Appl. No.: 16/119,208

(22) Filed: Aug. 31, 2018

(65) Prior Publication Data

US 2018/0373747 A1 Dec. 27, 2018

Related U.S. Application Data

(63) Continuation of application No. PCT/CN2017/074171, filed on Feb. 20, 2017.

(30) Foreign Application Priority Data

Mar. 1, 2016 (CN) .......................... 201610116003.0

(51) Int. Cl.
*G06F 16/00* (2019.01)
*G06F 16/22* (2019.01)
*G06F 16/21* (2019.01)

(52) U.S. Cl.
CPC ........ *G06F 16/2291* (2019.01); *G06F 16/213* (2019.01)

(58) Field of Classification Search
CPC ...... G06F 16/93; G06F 2216/11; G06F 16/34; G06F 16/353; G06F 16/382;
(Continued)

(56) References Cited

U.S. PATENT DOCUMENTS 6,574,631 B1 6/2003 Subramanian et al.
2003/0009574 A1* 1/2003 Bodin ................ H04N 21/8166
709/231
(Continued)

FOREIGN PATENT DOCUMENTS

CN 101046805 10/2007
CN 101504672 8/2009
(Continued)

OTHER PUBLICATIONS

International Search Report by the International Searching Authority issued in International Application No. PCT/CN2017/074171 dated May 23, 2017; 9 pages.
(Continued)

*Primary Examiner* — Shyue Jiunn Hwa
(74) *Attorney, Agent, or Firm* — Fish & Richardson P.C.

(57) ABSTRACT

A user identifier is obtained and an attribute identifier and an attribute value of at least one personal attribute corresponding to the user identifier is obtained. A target attribute correspondence to each personal attribute of the at least one personal attribute is generated based on the attribute identifier and the attribute value of the personal attribute. A determination is performed as to whether a target attribute storage field corresponding to the user identifier exists in stored first correspondences between one or more user identifiers and one or more attribute storage fields. When the target attribute storage field exists in the stored first correspondences, the target attribute correspondences are stored in the target attribute storage field.

20 Claims, 7 Drawing Sheets

(58) Field of Classification Search
CPC .... G06F 16/904; G06F 16/22; G06F 16/5846; G06F 16/80; G06F 16/951; G06F 3/0483; G06F 40/117; G06F 16/213; G06F 16/2291; G06F 21/6218; G06F 2213/0038; G06F 2221/2151; G06F 3/061; G06F 3/062; G06F 3/0643; G06F 3/067; G06F 21/88; G06F 2221/2111; G06F 16/26; G06F 16/2428; G06F 16/2455; G06F 16/2477; G06F 16/248; G06F 16/9038; G06F 3/0482; G06F 3/04847; G06F 21/552; G06F 21/554; G06F 2221/2101; G06F 21/00; G06F 21/316; G06F 21/34; G06F 21/46; G06F 21/60; G06F 21/77; G06F 2221/2139; G06F 2221/2149; G06F 2209/463; G06F 3/00

See application file for complete search history.

(56) References Cited

U.S. PATENT DOCUMENTS

| | | | |
|---|---|---|---|
| 2005/0223032 A1 | 10/2005 | Shan et al. | |
| 2010/0123916 A1* | 5/2010 | Tamura | H04N 1/00233 358/1.9 |
| 2010/0185871 A1* | 7/2010 | Scherrer | G06F 21/6218 713/186 |
| 2011/0208765 A1* | 8/2011 | Sano | G06F 16/9535 707/758 |
| 2013/0204879 A1* | 8/2013 | Zeng | G06F 16/22 707/747 |
| 2015/0006527 A1 | 1/2015 | Matsushita et al. | |
| 2015/0169895 A1 | 6/2015 | Gkoulalas-Divanis et al. | |
| 2015/0363478 A1* | 12/2015 | Haynes | G06F 16/26 707/625 |

FOREIGN PATENT DOCUMENTS

| | | |
|---|---|---|
| CN | 101395602 | 10/2011 |
| CN | 102243664 | 11/2011 |
| CN | 102436475 | 5/2012 |
| CN | 102541867 | 7/2012 |
| CN | 105354025 | 2/2016 |
| JP | 2002278810 | 9/2002 |
| JP | 2003256455 | 9/2003 |
| JP | 2006004026 | 1/2006 |
| KR | 100429142 | 4/2004 |
| KR | 20050077681 | 8/2005 |
| KR | 20070112219 | 11/2007 |
| KR | 20110013816 | 2/2011 |
| TW | 201227587 | 7/2012 |

OTHER PUBLICATIONS

Crosby et al., "BlockChain Technology: Beyond Bitcoin," Sutardja Center for Entrepreneurship & Technology Technical Report, Oct. 16, 2015, 35 pages.

Extended European Search Report in European Application No. 17759146.8, dated Jul. 24, 2019, 8 pages.

Nakamoto, "Bitcoin: A Peer-to-Peer Electronic Cash System," www.bitcoin.org, 2005, 9 pages.

International Preliminary Report on Patentability in International Application No. PCT/CN2017/074171 dated Sep. 4, 2018; 8 pages.

* cited by examiner

EFFICIENT STORAGE OF USER PERSONAL ATTRIBUTES FOR SERVICE PROVISIONING

CROSS-REFERENCE TO RELATED APPLICATIONS

This application is a continuation of PCT Application No. PCT/CN2017/074171, filed on Feb. 20, 2017, which claims priority to Chinese Patent Application No. 201610116003.0, filed on Mar. 1, 2016, and each application is hereby incorporated by reference in its entirety.

TECHNICAL FIELD

This application relates to the field of Internet technologies, and in particular, to a data processing method and device.

BACKGROUND

With the rapid development of Internet technologies, people are increasingly inclined to enjoy various convenient services on the Internet. For service providers, how to provide users with accurate services in specific areas is an important factor in obtaining users' recognition. In order to meet the individual needs of the users and provide users with accurate services, it is necessary to collect users' personal attributes and store these attributes, so that users can be provided with accurate services according to the users' personal attributes.

The personal attributes include some of the user's behavioral habits, interest preferences, customization requirements, etc. For example, the personal attributes include a user's preferred payment method, the user's preferred payment account number, the category of the product that the user is interested in, the user's frequently visited business, and the user's own default login account number.

The user's personal attribute includes the attribute name of the personal attribute and the attribute value of the personal attribute. For example, the attribute name of a personal attribute of the user is "default payment method" and the attribute value is "online payment". For another example, the attribute name of another personal attribute of the user is "category of the product of interest", and the attribute value is "digital home appliance".

Currently, in the existing technology, user's personal attributes are generally stored in the method shown in Table 1 below. Each field in the leftmost column in Table 1 stores an ID ( ) of each user, for example, user A to user M respectively; each field in the top row of Table 1 stores the attribute name of each personal attribute that is collected in advance by the technician, for example, attribute name 1 to attribute name N are respectively stored. Table 1 includes a total of (M+1)*(N+1) fields.

When it is necessary to store an attribute value of a personal attribute of a certain user in Table 1, Table 1 is searched for the row where the user ID of the user is located and for the column where the attribute name of the personal attribute is located. Then, the field located in both the found row and the found column is determined, and the field is filled in with the attribute value of the personal attribute.

In Table 1, if the field in a row where a user ID is located and in a column where an attribute name is located is an empty field, it indicates that the user corresponding to the user ID does not have the personal attribute corresponding to the attribute name.

TABLE 1

| | Attribute name 1 | Attribute name 2 | Attribute name 3 | ... | Attribute name N |
|---|---|---|---|---|---|
| User A | A1 | A2 | | | AN |
| User B | | B2 | B3 | | |
| ... | | | | | |
| User M | M1 | | M3 | | |

In a process of implementing this application, the inventors find that at least the following disadvantage exists in the solutions of related technologies:

There are various personal attributes collected by technicians in advance, and thus there will be a lot of fields included in the first row in Table 1, but sometimes the personal attributes of different users have large differences and low coincidence, and the personal attributes of each user account for only a small portion of all personal attributes collected in advance by the technicians. As a result, only a few fields in a row corresponding to a user ID may be filled with attribute values, and other fields are all empty fields. As such, there will be a lot of empty fields in Table 1, and because the empty fields occupy a certain amount of storage space, a lot of empty fields in Table 1 will take a huge amount of storage space.

SUMMARY

To alleviate the problems in the related technologies, the present disclosure provides a data processing method and device.

According to the first aspect of the implementations of the present disclosure, a data processing method is provided, and the method includes the following: obtaining a user identifier as well as an attribute identifier and an attribute value of at least one personal attribute corresponding to the user identifier; for each of the personal attributes, generating a target attribute correspondence of the personal attribute based on the attribute identifier and the attribute value of the personal attribute; determining whether a target attribute storage field corresponding to the user identifier exists in stored first correspondences between user identifiers and attribute storage fields; and storing all the target attribute correspondences in the target attribute storage field when the target attribute storage field corresponding to the user identifier exists in the first correspondences; or when no target attribute storage field corresponding to the user identifier exists in the first correspondences, creating an attribute storage field corresponding to the user identifier, and storing all the target attribute correspondences in the created attribute storage field.

The generating a target attribute correspondence of the personal attribute based on the attribute identifier and the attribute value of the personal attribute includes the following: establishing a target attribute correspondence between the attribute identifier of the personal attribute and the attribute value of the personal attribute; or obtaining stored second correspondences between attribute identifiers and index identifiers of sequence indexes; searching the second correspondences for an index identifier corresponding to the attribute identifier; and establishing a target attribute correspondence between the index identifier and the attribute value of the personal attribute.

The storing all the target attribute correspondences in the target attribute storage field includes the following: determining whether storage space occupied by all the target attribute correspondences is less than or equal to idle storage space of the target attribute storage field; and storing all the target attribute correspondences in the target attribute storage field when the storage space occupied by all the target attribute correspondences is less than or equal to the idle storage space of the target attribute storage field; or creating at least one new attribute storage field corresponding to the user identifier when the storage space occupied by all the target attribute correspondences is greater than the idle storage space of the target attribute storage field; and storing all the target attribute correspondences in the new attribute storage field or in the target attribute storage field and the new attribute storage field.

The storing all the target attribute correspondences in the target attribute storage field includes the following: determining a location where the target attribute correspondence is to be stored in the target attribute storage field based on the index identifier in the target attribute correspondence and index identifiers in all attribute correspondences stored in the target attribute storage field; and storing the target attribute correspondence in the determined location.

According to the second aspect of the implementations of the present disclosure, a data processing method is provided, and the method includes the following: when obtaining an acquisition request including a user identifier and an attribute identifier of a personal attribute, searching first correspondences between user identifiers and attribute storage fields to determine whether an attribute storage field corresponding to the user identifier exists in the first correspondences; when the attribute storage field corresponding to the user identifier exists, searching the attribute storage field to determine whether an attribute correspondence corresponding to the attribute identifier exists in the attribute storage field; and when the attribute correspondence corresponding to the attribute identifier exists, obtaining an attribute value in the attribute correspondence.

The searching the attribute storage field to determine whether an attribute correspondence corresponding to the attribute identifier exists in the attribute storage field includes the following: searching the attribute storage field to determine whether an attribute correspondence including the attribute identifier exists in the attribute storage field; and determining that the attribute correspondence corresponding to the attribute identifier exists in the attribute storage field when the attribute correspondence including the attribute identifier exists.

The searching the attribute storage field to determine whether an attribute correspondence corresponding to the attribute identifier exists in the attribute storage field includes the following: obtaining second correspondences between attribute identifiers and index identifiers; searching the second correspondences for an index identifier corresponding to the attribute identifier; searching the attribute storage field to determine whether an attribute correspondence including the index identifier exists in the attribute storage field; and determining that the attribute correspondence corresponding to the attribute identifier exists in the attribute storage field when the attribute correspondence including the index identifier exists.

According to the third aspect of the implementations of the present disclosure, a data processing device is provided, and the device includes the following: a first obtaining module, configured to obtain a user identifier as well as an attribute identifier and an attribute value of at least one personal attribute corresponding to the user identifier; a generating module, configured to generate, for each of the personal attributes, a target attribute correspondence of the personal attribute based on the attribute identifier and the attribute value of the personal attribute; a determining module, configured to determine whether a target attribute storage field corresponding to the user identifier exists in stored first correspondences between user identifiers and attribute storage fields; a first storing module, configured to store all the target attribute correspondences in the target attribute storage field when the target attribute storage field corresponding to the user identifier exists in the first correspondences; and a creating module, configured to create an attribute storage field corresponding to the user identifier when no target attribute storage field corresponding to the user identifier exists in the first correspondences; and a second storing module, configured to store all the target attribute correspondences in the created attribute storage field.

The generating module includes the following: a first establishment unit, configured to establish a target attribute correspondence between the attribute identifier of the personal attribute and the attribute value of the personal attribute; or a first obtaining unit, configured to obtain stored second correspondences between attribute identifiers and index identifiers of sequence indexes; a searching unit, configured to search the second correspondences for an index identifier corresponding to the attribute identifier; and a second establishment unit, configured to establish a target attribute correspondence between the index identifier and the attribute value of the personal attribute.

The first storing module includes the following: a determining unit, configured to determine whether storage space occupied by all the target attribute correspondences is less than or equal to idle storage space of the target attribute storage field; and a first storing unit, configured to store all the target attribute correspondences in the target attribute storage field when the storage space occupied by all the target attribute correspondences is less than or equal to the idle storage space of the target attribute storage field; a creating unit, configured to create at least one new attribute storage field corresponding to the user identifier when the storage space occupied by all the target attribute correspondences is greater than the idle storage space of the target attribute storage field; and a second storing unit, configured to store all the target attribute correspondences in the new attribute storage field or in the target attribute storage field and the new attribute storage field.

The first storing module includes the following: a first determining unit, configured to determine a location where the target attribute correspondence is to be stored in the target attribute storage field based on the index identifier in the target attribute correspondence and index identifiers in all attribute correspondences stored in the target attribute storage field; and a third storing unit, configured to store the target attribute correspondence in the determined location.

According to the fourth aspect of the implementations of the present disclosure, a data processing device is provided, and the device includes the following: a first searching module, configured to search, when an acquisition request including a user identifier and an attribute identifier of a personal attribute is obtained, first correspondences between user identifiers and attribute storage fields to determine whether an attribute storage field corresponding to the user identifier exists in the first correspondences; a second searching module, configured to search, when the attribute storage field corresponding to the user identifier exists, the attribute storage field to determine whether an attribute correspondence corresponding to the attribute identifier exists in the attribute storage field; and a second obtaining module, configured to obtain an attribute value in the attribute correspondence when the attribute correspondence corresponding to the attribute identifier exists.

The second searching module includes the following: a first searching unit, configured to search the attribute storage field to determine whether an attribute correspondence including the attribute identifier exists in the attribute storage field; and a second determining unit, configured to determine that the attribute correspondence corresponding to the attribute identifier exists in the attribute storage field when the attribute correspondence including the attribute identifier exists.

The second searching module includes the following: a second obtaining unit, configured to obtain second correspondences between attribute identifiers and index identifiers; a second searching unit, configured to search the second correspondences for an index identifier corresponding to the attribute identifier; a third searching unit, configured to search the attribute storage field to determine whether an attribute correspondence including the index identifier exists in the attribute storage field; and a third determining unit, configured to determine that the attribute correspondence corresponding to the attribute identifier exists in the attribute storage field when the attribute correspondence including the index identifier exists.

The technical solutions provided in the implementations of the present disclosure have the following beneficial effects:

In the implementations of the present disclosure, a user ID as well as an attribute identifier ID and an attribute value of at least one personal attribute corresponding to the user ID are obtained; for each of the personal attributes, a target attribute correspondence of the personal attribute is generated based on the attribute ID and the attribute value of the personal attribute; whether a target attribute storage field corresponding to the user ID exists in stored first correspondences between user IDs and attribute storage fields is determined; and all the target attribute correspondences are stored in the target attribute storage field when the target attribute storage field corresponding to the user ID exists in the first correspondences; alternatively an attribute storage field corresponding to the user ID is created when no target attribute storage field corresponding to the user ID exists in the first correspondences, and all the target attribute correspondences are stored in the created attribute storage field.

The storage structure in the existing technology is abandoned in the implementation of the present disclosure. First, there is no empty field, thereby avoiding the problem of wasting storage space for empty fields, and achieving the purpose of saving storage space. In addition, in the existing technology, only one attribute value is stored in each field. However, in the implementations of the present disclosure, a plurality of attribute correspondences are stored in one attribute storage field, and each attribute correspondence includes an attribute value. Thus, compared with the existing technology, in the implementations of the present disclosure, a plurality of attribute values are stored in one attribute storage field, and the storage space in an attribute storage field is fully utilized, thereby saving storage space.

Moreover, with the rapid development of service business, the user's personalized needs emerge in an inexhaustible variety. Therefore, it is often necessary to open up new personal attributes. In this case, a field needs to be added on the rightmost side of the first row in Table 1 in the existing technology, and the attribute name of the new personal attribute is added to the newly added field. Then a new field needs to be added on the rightmost side of the row of each user ID in Table 1 so that when a user has the new personal attribute, the newly added field on the rightmost side of the row where the user ID is located is filled in with the attribute value of the personal attribute.

However, in this case, not all of the users corresponding to the user IDs in Table 1 have the new personal attribute, and thus will not fill the newly added fields on the rightmost side of the row where all the user IDs are located with attribute values, which leads to some empty fields and wasting storage space, more or less.

In addition, in the process of adding new fields to Table 1, it is necessary to lock Table 1, and Table 1 in the locked state cannot be used. When there are a great many user IDs stored in Table 1, that is, there is a large number of rows in Table 1, adding new fields to the rightmost side of the row where all the user IDs are located will consume plenty of time. As a result, Table 1 cannot be used for too much time, resulting in the inability to provide users with accurate services in a long period. However, in the implementation of the present disclosure, even if a new personal attribute is developed, there is no need to allocate a field for the new personal attribute that has been developed, and there is no need to lock the stored personal attributes, so that the users can be provided with accurate services constantly. In addition, there is no need to allocate fields for the new personal attributes that have been developed, and accordingly there is no empty field, thereby alleviating the problem of wasting storage space.

It should be understood that the foregoing general description and the following detailed description are merely examples, and impose no limitation on the present disclosure.

BRIEF DESCRIPTION OF DRAWINGS

The accompanying drawings, which are incorporated in and constitute a part of the present specification, illustrate implementations consistent with the present disclosure and, together with the description, serve to explain the principles of the present disclosure.

DESCRIPTION OF IMPLEMENTATIONS

The implementations are described in detail herein, and examples of the implementations are presented in the accompanying drawings. When the following description relates to the accompanying drawings, unless specified otherwise, same numbers in different accompanying drawings represent same or similar elements. Implementations described in the following do not represent all implementations consistent with the present disclosure. On the contrary, the implementations are only examples of devices and methods that are described in the appended claims in details and consistent with some aspects of the present disclosure.

Figure 1:
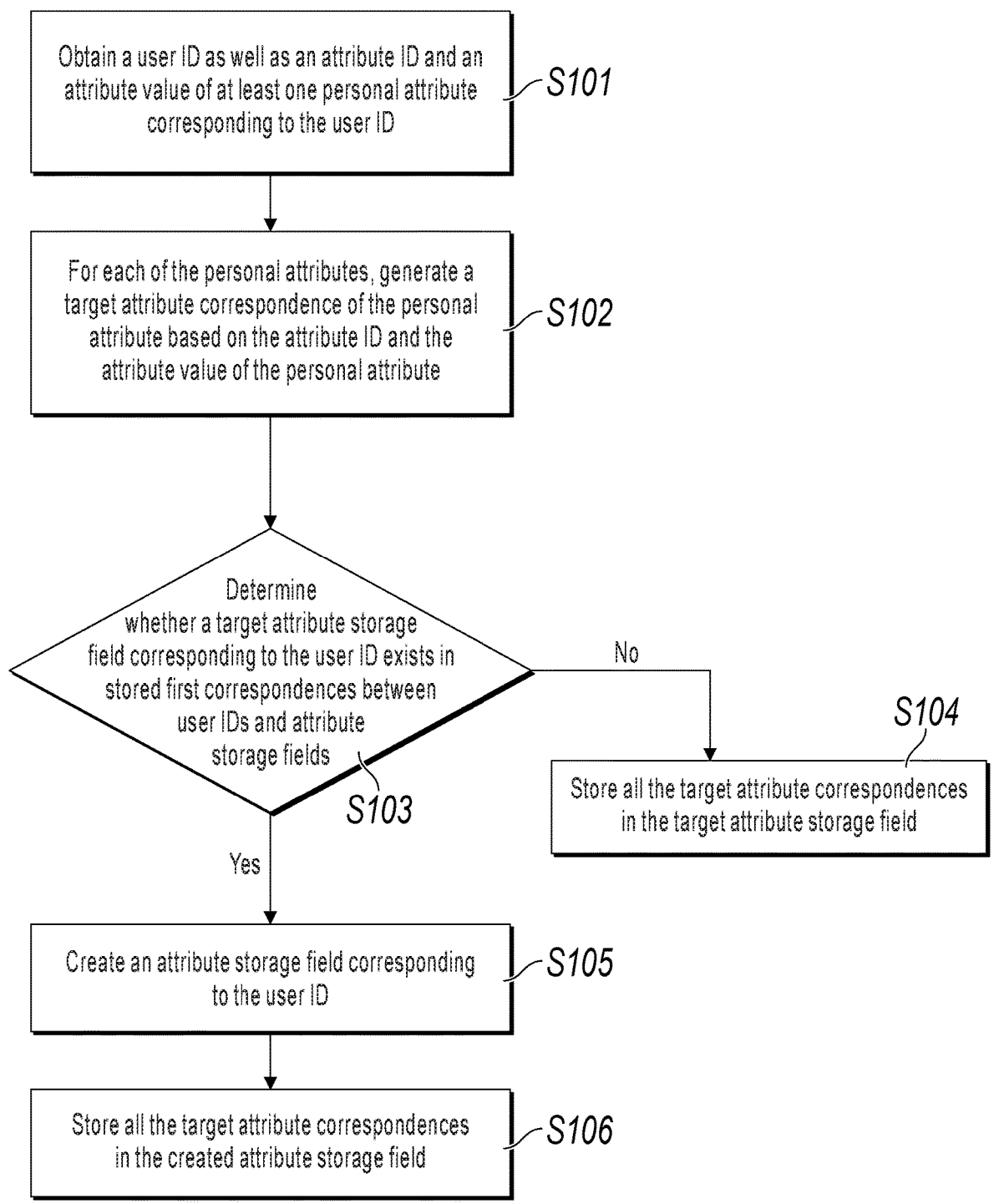
FIG. 1 is a flowchart illustrating a data processing method according to an implementation.

FIG. 1 is a flowchart illustrating a data processing method according to an implementation. As shown in FIG. 1, the method includes the following steps.

Step S101: Obtain a user identifier (ID) as well as an attribute identifier (ID) and an attribute value of at least one personal attribute corresponding to the user ID.

The user ID may be a user's account number. For example, the user can register a user account in the server in advance, and the user ID can be the account number of the user account.

The attribute ID of the personal attribute can be the name of the personal attribute, for example, "default payment method" and "default payment account number", etc.

When the name of the personal attribute is "default payment method", the attribute value of the personal attribute can be "online payment" or "cash on delivery".

When the name of the personal attribute is "default payment account number", the attribute value of the personal attribute may be an account number, for example, "273356214" or "178549624".

When the name of the personal attribute is "category of the product of interest", the attribute value of the personal attribute can be "digital home appliance", "food", or "shoe/bag", etc.

In the implementation of the present disclosure, when the server stores personal attributes of a certain user for the first time, the server can obtain the user ID of the user, and the attribute ID and the attribute value of each personal attribute of the user from the user account of the user.

Afterwards, after the user logs in to the server using the user's own user ID on the user's own terminal device, if the user updates the attribute value corresponding to the attribute ID of one or more existing personal attributes in the user's own account, the terminal device obtains the user ID of the user, the attribute ID of the one or more updated personal attributes, and the attribute value corresponding to each attribute ID of the updated one or more personal attributes, and then sends the obtained user ID, the attribute ID, and the attribute value to the server. The server receives the user ID, the attribute ID, and the attribute value sent by the terminal device.

After the user logs in to the server using the user's own user ID on the user's own terminal device, if the user adds an attribute ID of one or more new personal attributes and the attribute value corresponding to each new attribute ID to the user's own account, the terminal device obtains the user ID of the user, the attribute ID of each new personal attribute, and the attribute value corresponding to the attribute ID of each new personal attribute, and then sends the obtained user ID, the attribute ID, and the attribute value to the server. The server receives the user ID, the attribute ID, and the attribute value sent by the terminal device.

Step S102. For each of the personal attributes, generate a target attribute correspondence of the personal attribute based on the attribute ID and the attribute value of the personal attribute.

In an implementation of the present disclosure, for each of the personal attributes, the target attribute correspondence between the attribute ID of the personal attribute and the attribute value of the personal attribute can be established. The target attribute correspondence includes the attribute ID of the personal attribute and the attribute value of the personal attribute. The attribute ID of the personal attribute and the attribute value of the personal attribute can form a key-value pair. The operation is executed for each personal attribute.

In the key-value pair, "key" is used to represent the attribute ID of the personal attribute, "value" is used to represent the attribute value of the personal attribute, and the attribute ID and the attribute value are connected by using a first predetermined identifier. The first predetermined identifier may be "=", "−" or "+", etc., which is not limited in the present disclosure.

For example, assume that the attribute ID of the personal attribute is "default payment method" and the attribute value of the personal attribute is "online payment", the target attribute correspondence may be "default payment method=online payment".

In the foregoing implementation, the attribute ID of the personal attribute is usually the name of the personal attribute, for example, "default payment method", "default payment account number", and "category of the product of interest". However, the name of the personal attribute usually includes many characters, and thus the attribute ID of the personal attribute occupies a large amount of storage space. Since the attribute correspondence includes the attribute ID of the personal attribute, the attribute correspondence occupies a relatively large amount of storage space if the attribute ID occupies a large amount of storage space.

The present disclosure aims to store as many attribute correspondences as possible in one attribute storage field. However, the total storage space of one attribute storage field is limited. Therefore, in the case where the attribute correspondence occupies a relatively large storage space, the number of attribute correspondences that can be stored in one attribute storage field is smaller.

To store more attribute correspondences in one attribute storage field, in another implementation of the present disclosure, an index identifier (ID) can be allocated for each personal attribute in advance. Different index IDs are allocated for different personal attributes. The storage space occupied by the attribute ID of each personal attribute is smaller than the storage space occupied by the index ID allocated for the attribute ID of the personal attribute.

Then the attribute ID of each personal attribute and the index ID allocated for the personal attribute are stored in the second correspondences between attribute IDs and index IDs of sequence indexes.

There is a predetermined index order among all allocated index IDs. For example, the index IDs are numerical numbers, such as 1, 2, 3, 4, and 5, etc., and the numerical numbers are arranged in ascending order.

As such, in another implementation of the present disclosure, the generating a target attribute correspondence of the personal attribute based on the attribute ID and the attribute value of the personal attribute may be as follows:

For any personal attribute, the stored second correspondences between attribute IDs and index IDs of sequence indexes are obtained, the second correspondences are searched for an index ID corresponding to an attribute ID of the personal attribute, and a target attribute correspondence between the index ID and the attribute value of the personal attribute is established so that the target attribute correspondence of the personal attribute can be generated based on the attribute ID and the attribute value of the personal attribute. The target attribute correspondence includes the index ID corresponding to the attribute ID of the personal attribute and the attribute value of the personal attribute. The index ID corresponding to the attribute ID of the personal attribute and the attribute value of the personal attribute can form a key-value pair. The operation is executed for each personal attribute.

In the key-value pair, "key" is used to represent the index ID corresponding to the attribute ID of the personal attribute, "value" is used to represent the attribute value of the personal attribute, and the index ID and the attribute value are connected by using a first predetermined identifier. The first predetermined identifier may be "=", "−", or "+", etc., which is not limited in the present disclosure.

For example, assume that the attribute ID of the personal attribute is "default payment method", the attribute value of the personal attribute is "online payment", and the index ID corresponding to the attribute ID of the personal attribute is 1, the target attribute correspondence may be "1=online payment".

Step S103: Determine whether a target attribute storage field corresponding to the user ID exists in stored first correspondences between user IDs and attribute storage fields.

For any user who registers an account in the server, when the server stores the attribute correspondence of the user for the first time, an attribute storage field corresponding to the user ID is established in the first correspondences between user IDs and attribute storage fields. Then the attribute correspondence of the user is stored in the attribute storage field. In the implementation of the present disclosure, if a new personal attribute of the user is added later, after a new attribute correspondence of the new personal attribute is generated based on the attribute ID and the attribute value of the new personal attribute, the new attribute correspondence continues to be stored in the attribute storage field. The same applies to every other user who registers an account with the server.

After the target attribute correspondence is generated, it needs to be determined whether the target attribute storage field corresponding to the user ID exists in the stored first correspondences between user IDs and attribute storage fields.

If the target attribute storage field corresponding to the user ID exists, the target attribute correspondence can be directly stored in the target attribute storage field.

If the target attribute storage field corresponding to the user ID does not exist, it indicates that the attribute correspondence of the user has not been stored before, that is, no attribute storage field corresponding to the user ID has been stored. In this case, the attribute storage field corresponding to the user ID needs to be created in the first correspondences, and then the target attribute correspondence can be stored in the created attribute storage field.

Step S104: Store all the target attribute correspondences in the target attribute storage field when the target attribute storage field corresponding to the user ID exists in the first correspondences.

Step S105: Create an attribute storage field corresponding to the user ID when no target attribute storage field corresponding to the user ID exists in the first correspondences, and execute step S106.

Step S106: Store all the target attribute correspondences in the created attribute storage field.

In the implementation shown in FIG. 1 of the present disclosure, a user ID as well as an attribute ID and an attribute value of at least one personal attribute corresponding to the user ID are obtained; for each of the personal attributes, a target attribute correspondence of the personal attribute is generated based on the attribute ID and the attribute value of the personal attribute; whether a target attribute storage field corresponding to the user ID exists in stored first correspondences between user IDs and attribute storage fields is determined; and all the target attribute correspondences are stored in the target attribute storage field when the target attribute storage field corresponding to the user ID exists in the first correspondences; alternatively an attribute storage field corresponding to the user ID is created when no target attribute storage field corresponding to the user ID exists in the first correspondences, and all the target attribute correspondences are stored in the created attribute storage field.

The storage structure in the existing technology is abandoned in the implementation of the present disclosure. First, there is no empty field, thereby avoiding the problem of wasting storage space for empty fields, and achieving the purpose of saving storage space. In addition, in the existing technology, only one attribute value is stored in each field. However, in the implementations of the present disclosure, a plurality of attribute correspondences are stored in one attribute storage field, and each attribute correspondence includes an attribute value. Thus, compared with the existing technology, in the implementations of the present disclosure, a plurality of attribute values are stored in one attribute storage field, and the storage space in an attribute storage field is fully utilized, thereby saving storage space.

Moreover, with the rapid development of service business, the user's personalized needs emerge in an inexhaustible variety. Therefore, it is often necessary to open up new personal attributes. In this case, a field needs to be added on the rightmost side of the first row in Table 1 in the existing technology, and the attribute name of the new personal attribute is added to the newly added field. Then a new field needs to be added on the rightmost side of the row of each user ID in Table 1 so that when a user has the new personal attribute, the newly added field on the rightmost side of the row where the user ID is located is filled in with the attribute value of the personal attribute.

However, in this case, not all of the users corresponding to the user IDs in Table 1 have the new personal attribute, and thus will not fill the newly added fields on the rightmost side of the row where all the user IDs are located with attribute values, which leads to some empty fields and wasting storage space, more or less.

In addition, in the process of adding new fields to Table 1, it is necessary to lock Table 1, and Table 1 in the locked state cannot be used. When there are a great many user IDs stored in Table 1, that is, there is a large number of rows in Table 1, adding new fields to the rightmost side of the row where all the user IDs are located will consume plenty of time. As a result, Table 1 cannot be used for too much time, resulting in the inability to provide users with accurate services in a long period. However, in the implementation of the present disclosure, even if a new personal attribute is developed, there is no need to allocate a field for the new personal attribute that has been developed, and there is no need to lock the stored personal attributes, so that the users can be provided with accurate services constantly. In addition, there is no need to allocate fields for the new personal attributes that have been developed, and accordingly there is no empty field, thereby alleviating the problem of wasting storage space.

Figure 2:
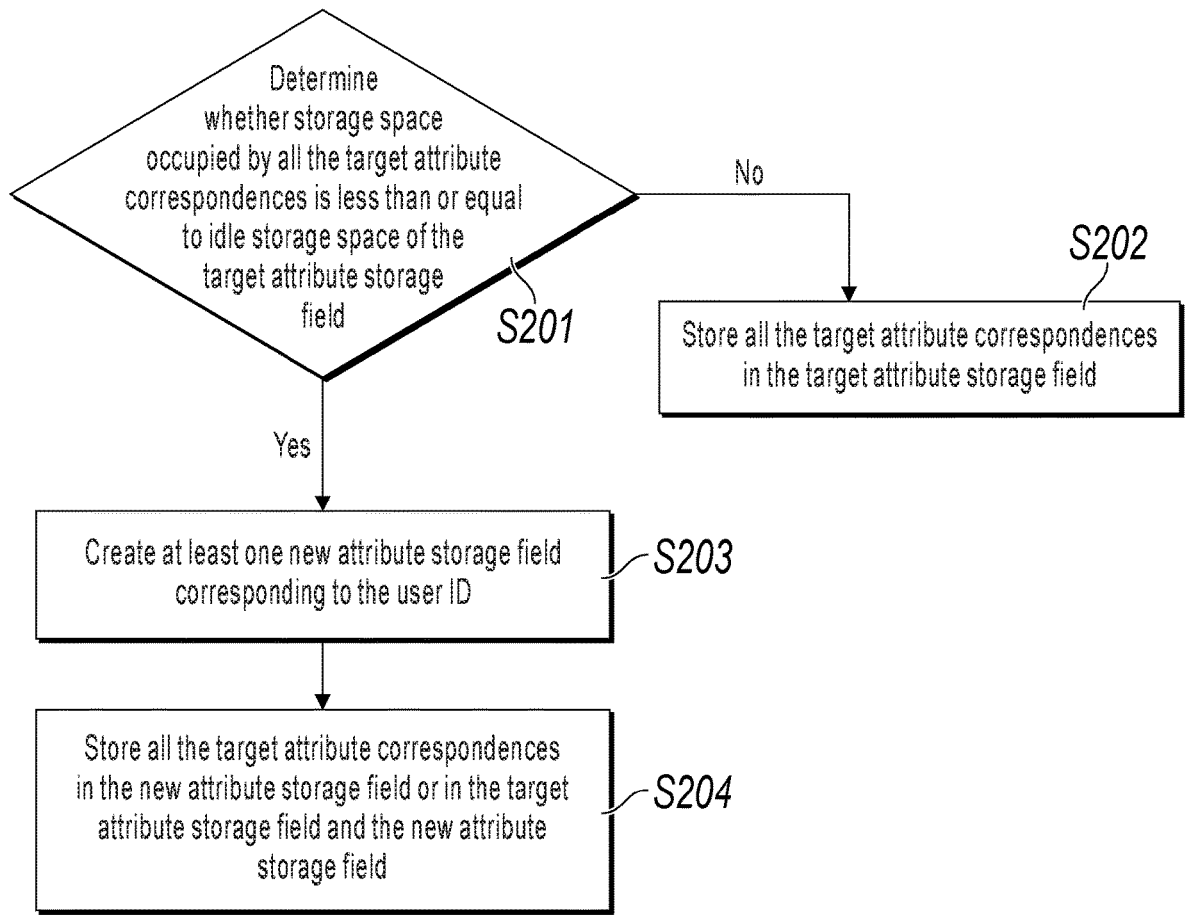
FIG. 2 is a flowchart illustrating a data processing method according to an implementation.

In another implementation of the present disclosure, referring to FIG. 2, the step S104 includes the following:

Step S201: Determine whether storage space occupied by all the target attribute correspondences is less than or equal to idle storage space of the target attribute storage field.

In the implementation of the present disclosure, each character occupies one unit of storage space, and each attribute correspondence includes a plurality of characters. Therefore, each attribute correspondence occupies a certain amount of storage space. Since the available storage space of an attribute storage field is limited, when an attribute correspondence needs to be stored in an attribute storage field, an objective condition must be satisfied: storage space occupied by the attribute correspondence is less than or equal to available storage space of the attribute storage field. Only when the condition is satisfied, the attribute correspondence can be successfully stored in the attribute storage field. Otherwise, if the storage space occupied by the attribute correspondence is greater than the available storage space of the attribute storage field, the attribute correspondence cannot be successfully stored in the attribute storage field.

Similarly, when a plurality of attribute correspondences need to be stored in an attribute storage field, it is also required to determine whether the storage space occupied by the plurality of attribute correspondences is less than or equal to the idle storage space of the attribute storage field.

Step S202: Store all the target attribute correspondences in the target attribute storage field when the storage space occupied by all the target attribute correspondences is less than or equal to the idle storage space of the target attribute storage field.

When the storage space occupied by all the target attribute correspondences is less than or equal to the idle storage space of the target attribute storage field, it indicates that the target attribute storage field can accommodate all the target attribute correspondences, and therefore all the target attribute correspondences can be directly stored in the target attribute storage field.

Step S203: Create at least one new attribute storage field corresponding to the user ID when the storage space occupied by all the target attribute correspondences is greater than the idle storage space of the target attribute storage field, and then execute step S204.

When the storage space occupied by all the target attribute correspondences is greater than the idle storage space of the target attribute storage field, it indicates that the target attribute storage field cannot accommodate all the target attribute correspondences, and therefore at least one new attribute storage field corresponding to the user ID needs to be created.

The number of new attribute storage fields to be created can be determined based on the available storage space of one attribute storage field, the storage space occupied by all the target attribute correspondences, or the available storage space of the target attribute field. A specific determining method is not limited in the present disclosure.

Step S204: Store all the target attribute correspondences in the new attribute storage field or in the target attribute storage field and the new attribute storage field.

If the target attribute storage field has been fully occupied, the target attribute correspondences are stored in the new attribute storage field. If the target attribute storage field has not been fully occupied, some target attribute correspondences can be first stored in the target attribute storage field, and after the target attribute storage field is fully occupied, the remaining target attribute correspondences are stored in the new attribute storage field.

When all the target attribute correspondences are being stored, the predetermined second separator can be used to separate adjacent attribute correspondences so as to prevent different attribute correspondences from being confused with each other. The predetermined second separator can be "|", "*", or "~", etc., which is not limited in the present disclosure.

For example, assume that an attribute correspondence is "default payment method=online payment", another attribute correspondence is "category of the product of interest=digital home appliance", and still another attribute correspondence is "default payment account number=123456789". When the three attribute correspondences are stored in the attribute storage field, the predetermined second separator "|" can be used to separate the three attribute correspondences: "default payment method=online payment|category of the product of interest=digital home appliance|default payment account number=123456789".

In the previous implementation, the attribute correspondence includes the index ID corresponding to the attribute ID of the personal attribute and the attribute value of the personal attribute, and there is a predetermined index order among the index IDs of all the personal attributes. Therefore, in the implementation of the present disclosure, the target attribute correspondences can be stored based on the index IDs included in the target attribute correspondences and the predetermined index order among the index IDs in the stored attribute correspondences, so as to improve the efficiency of querying an attribute value of a personal attribute subsequently.

Figure 3:
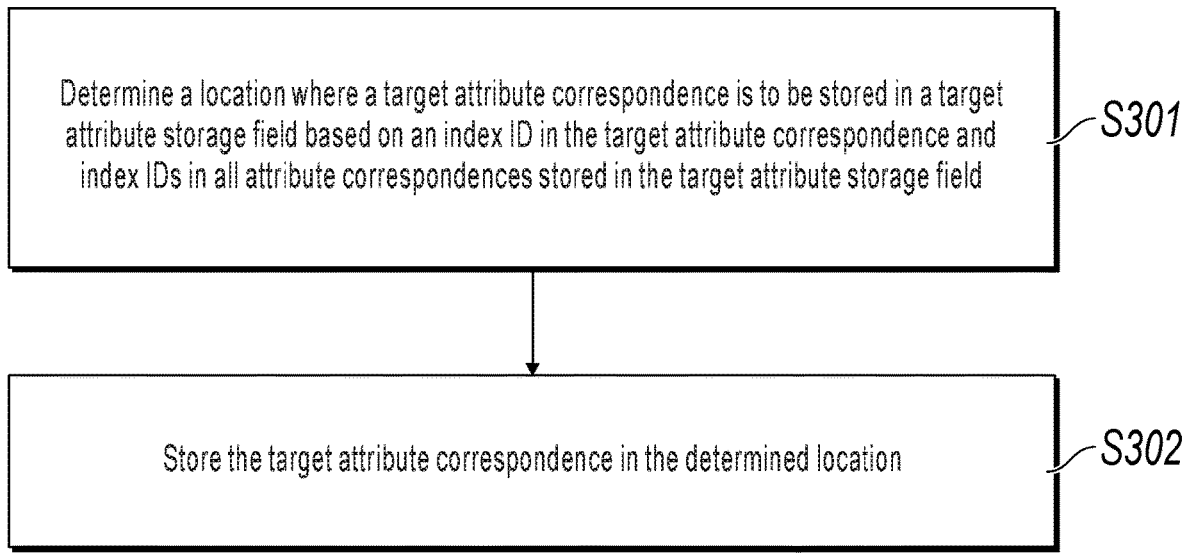
FIG. 3 is a flowchart illustrating a data processing method according to an implementation.

Thus, in another implementation of the present disclosure, referring to FIG. 3, the step S104 includes the following:

Step S301: Determine a location where the target attribute correspondence is to be stored in the target attribute storage field, based on the index ID in the target attribute correspondence and index IDs in all attribute correspondences stored in the target attribute storage field.

The locations of the attribute correspondences in the attribute storage field in the implementation of the present disclosure are determined after being sorted based on the predetermined index order among the index IDs included in the attribute correspondences.

For example, assume that the index ID is a serial number, for example, 1, 2, 3, 4, and 5, etc. For any attribute storage field, in two attribute storage fields adjacent to the attribute storage field, the serial number of one attribute storage field is greater than that of the attribute storage field, and the serial number of the other attribute storage field is less than that of the attribute storage field. The same applies to every other attribute storage field.

In the present step, the target attribute correspondence can be sorted in all the stored attribute correspondences based on the index ID in the target attribute correspondence and the index IDs in the stored attribute correspondences, and two attribute correspondences in the target attribute storage field between which the target attribute correspondence is located are determined. In the two attribute correspondences, the serial number of one attribute correspondence is greater than the serial number of the target attribute correspondence, and the serial number of the other attribute correspondence is less than the serial number of the target attribute correspondence. The location between the two attribute correspondences can be determined as the location where the target attribute correspondence is to be stored.

Step S302: Store the target attribute correspondence in the determined location.

Figure 4:
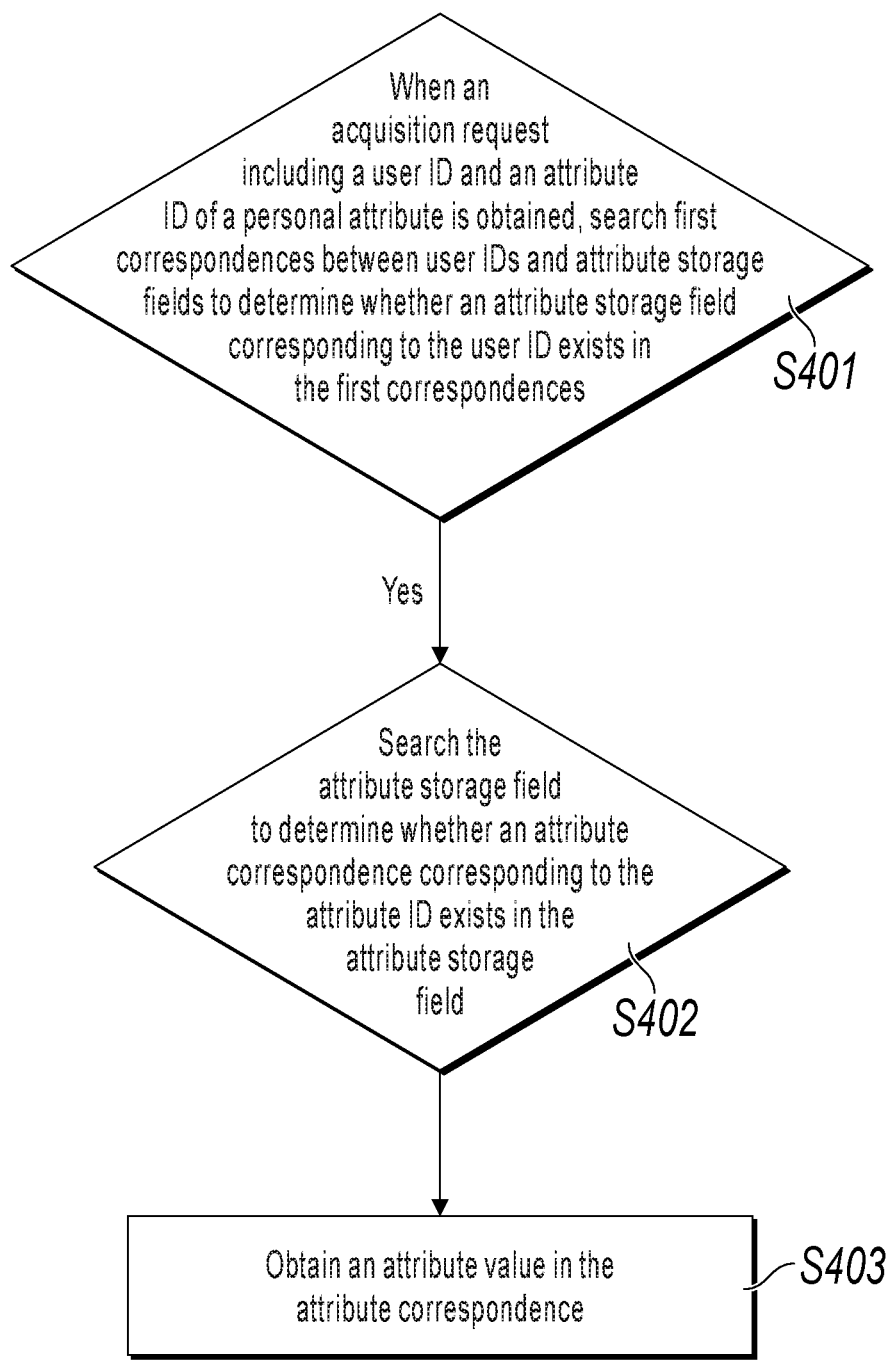
FIG. 4 is a flowchart illustrating a data processing method according to an implementation.

When it is necessary to provide the user with precise services, the server needs to query the attribute value of one or more personal attributes of the user. Referring to FIG. 4, the query can be performed according to the following method. The method includes the following steps:

Step S401: When an acquisition request including a user ID and an attribute ID of a personal attribute is obtained, search first correspondences between user IDs and attribute storage fields to determine whether an attribute storage field corresponding to the user ID exists in the first correspondences.

In the implementation of the present disclosure, when it is necessary to provide a precise service to the user, the attribute value of one or more personal attributes of the user needs to be obtained. First, an acquisition request is generated based on the user ID of the user and the attribute ID of the personal attribute that needs to be obtained. Afterwards, the first correspondences between user IDs and attribute storage fields can be obtained, and the first correspondences are searched to determine whether the attribute storage field corresponding to the user ID exists in the first correspondences.

Step S402: When the attribute storage field corresponding to the user ID exists, search the attribute storage field to determine whether an attribute correspondence corresponding to the attribute ID exists in the attribute storage field.

In an implementation of the present disclosure, if the attribute correspondence is a correspondence between the attribute ID and the attribute value, the attribute storage field can be searched in the present step to determine whether an attribute correspondence including the attribute ID exists in the attribute storage field; and it can be determined that the attribute correspondence corresponding to the attribute ID exists in the attribute storage field when the attribute correspondence including the attribute ID exists.

Specifically, the first attribute correspondence is obtained in the attribute storage field, an attribute ID in the first attribute correspondence is obtained, and whether the attribute ID in the first attribute correspondence is the same as the attribute ID is determined. When the two are the same, the first attribute correspondence is determined as the attribute correspondence corresponding to the attribute ID. Alternatively, when the two are different, the second attribute correspondence is obtained, an attribute ID in the second attribute correspondence is obtained, and whether the attribute ID in the second attribute correspondence is the same as the attribute ID is determined. When the two are the same, the second attribute correspondence is determined as the attribute correspondence corresponding to the attribute ID. Alternatively, when the two are different, a next attribute correspondence is obtained, and the foregoing procedure is executed until an attribute ID in an attribute correspondence is the same as the attribute ID, and the obtained attribute correspondence is determined as the attribute correspondence corresponding to the attribute ID. If the attribute IDs in all the attribute correspondences in the attribute storage field are different from the attribute ID, it can be determined that there is no attribute correspondence corresponding to the attribute ID in the attribute storage field.

When there is no attribute storage field corresponding to the attribute ID, the procedure ends.

Generally, the attribute storage field stores a plurality of attribute correspondences. If the attribute correspondence corresponding to the attribute ID is stored in a later position in the attribute storage field, most of the attribute correspondences will be traversed according to the foregoing method, which takes a long time and has low search efficiency.

In another implementation of the present disclosure, if the attribute correspondence is the correspondence between the index ID corresponding to the attribute ID and the attribute value, second correspondences between attribute IDs and index IDs can be obtained in this step. The second correspondences are searched for the index ID corresponding to the attribute ID; the attribute storage field is searched to determine whether the attribute correspondence including the index ID exists in the attribute storage field; and when the attribute correspondence including the index ID exists, it can be determined that the attribute correspondence corresponding to the attribute ID exists in the attribute storage field.

The locations of the attribute correspondences in the attribute storage field in the implementation of the present disclosure are determined after being sorted based on the predetermined index order among the index IDs included in the attribute correspondences. Therefore, to improve the search efficiency, when the attribute storage field is searched to determine whether the attribute correspondence including the index ID exists in the attribute storage field, first the index ID can be compared with index IDs in attribute correspondences at one or more predetermined locations in the attribute storage field; the approximate location of the attribute correspondence including the index ID in the attribute storage field is determined based on the comparison result; and then the index ID is compared with the index ID in one or more attribute correspondence at the approximate location so as to determine whether the attribute correspondence including the index ID exists.

Step S403: Obtain an attribute value in the attribute correspondence when the attribute correspondence corresponding to the attribute ID exists.

When the attribute correspondence corresponding to the attribute ID does not exist, it indicates that the user corresponding to the user ID does not have the personal attribute. Moreover, it can be prompted to the user that the user corresponding to the user ID does not have the personal attribute.

Figure 5:
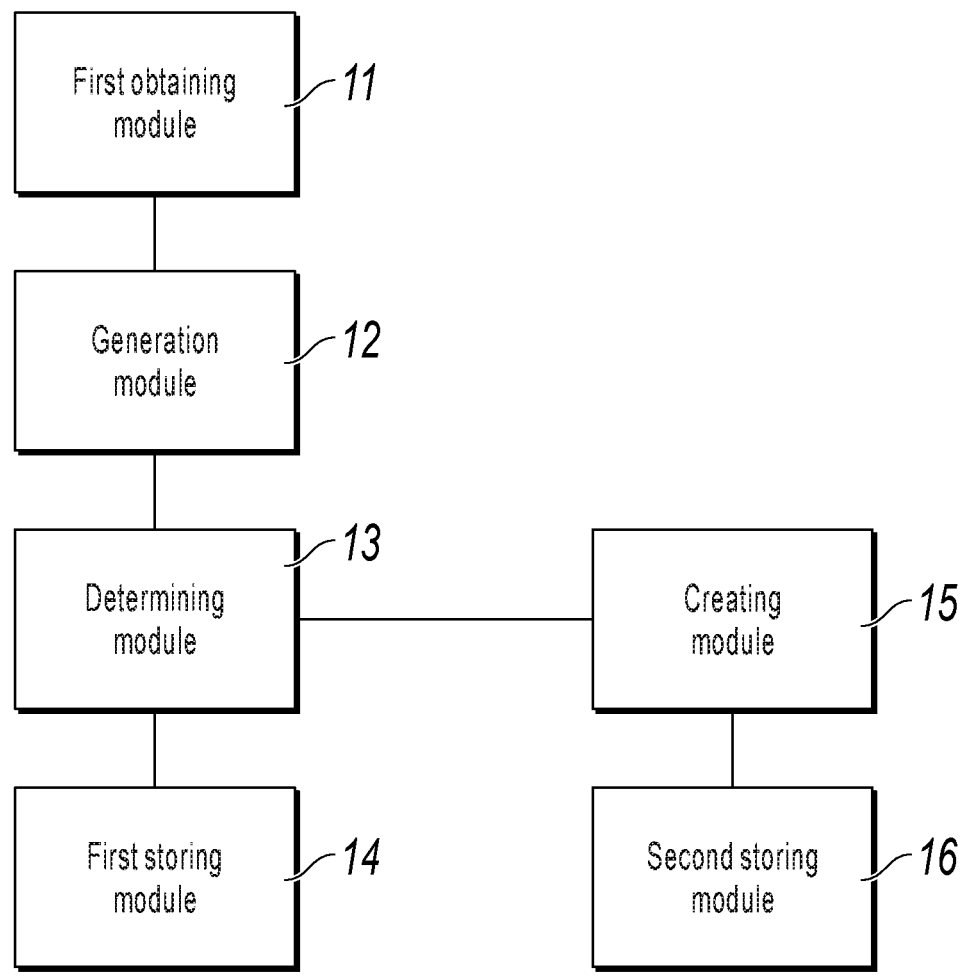
FIG. 5 is a block diagram illustrating a data processing device according to an implementation.

FIG. 5 is a block diagram illustrating a data processing device according to an implementation. Referring to FIG. 5, the device includes the following: a first obtaining module 11, configured to obtain a user ID as well as an attribute ID and an attribute value of at least one personal attribute corresponding to the user ID; a generating module 12, configured to generate, for each of the personal attributes, a target attribute correspondence of the personal attribute based on the attribute ID and the attribute value of the personal attribute; a determining module 13, configured to determine whether a target attribute storage field corresponding to the user ID exists in stored first correspondences between user IDs and attribute storage fields; a first storing module 14, configured to store all the target attribute correspondences in the target attribute storage field when the target attribute storage field corresponding to the user ID exists in the first correspondences; and a creating module 15, configured to create an attribute storage field corresponding to the user ID when no target attribute storage field corresponding to the user ID exists in the first correspondences; and a second storing module 16, configured to store all the target attribute correspondences in the created attribute storage field.

The generating module 12 includes the following: a first establishment unit, configured to establish a target attribute correspondence between the attribute ID of the personal attribute and the attribute value of the personal attribute; or a first obtaining unit, configured to obtain second correspondences between stored attribute IDs and index IDs of sequence indexes; a searching unit, configured to search the second correspondences for an index ID corresponding to the attribute ID; and a second establishment unit, configured to establish a target attribute correspondence between the index ID and the attribute value of the personal attribute.

The first storing module 14 includes the following: a determining unit, configured to determine whether storage space occupied by all the target attribute correspondences is less than or equal to idle storage space of the target attribute storage field; and a first storing unit, configured to store all the target attribute correspondences in the target attribute storage field when the storage space occupied by all the target attribute correspondences is less than or equal to the idle storage space of the target attribute storage field; a creating unit, configured to create at least one new attribute storage field corresponding to the user ID when the storage space occupied by all the target attribute correspondences is greater than the idle storage space of the target attribute storage field; and a second storing unit, configured to store all the target attribute correspondences in the new attribute storage field or in the target attribute storage field and the new attribute storage field.

The first storing module 14 includes the following: a first determining unit, configured to determine a location where the target attribute correspondence is to be stored in the target attribute storage field based on the index ID in the target attribute correspondence and index IDs in all attribute correspondences stored in the target attribute storage field; and a third storing unit, configured to store the target attribute correspondence in the determined location.

In the implementation shown in FIG. 5 of the present disclosure, a user ID as well as an attribute ID and an attribute value of at least one personal attribute corresponding to the user ID are obtained. For each of the personal attributes, a target attribute correspondence of the personal attribute is generated based on the attribute ID and the attribute value of the personal attribute. Whether a target attribute storage field corresponding to the user ID exists in stored first correspondences between user IDs and attribute storage fields is determined; and all the target attribute correspondences are stored in the target attribute storage field when the target attribute storage field corresponding to the user ID exists in the first correspondences. Alternatively an attribute storage field corresponding to the user ID is created when no target attribute storage field corresponding to the user ID exists in the first correspondences, and all the target attribute correspondences are stored in the created attribute storage field.

The storage structure in the existing technology is abandoned in the implementation of the present disclosure. First, there is no empty field, thereby avoiding the problem of wasting storage space for empty fields, and achieving the purpose of saving storage space. In addition, in the existing technology, only one attribute value is stored in each field. However, in the implementations of the present disclosure, a plurality of attribute correspondences are stored in one attribute storage field, and each attribute correspondence includes an attribute value. Thus, compared with the existing technology, in the implementations of the present disclosure, a plurality of attribute values are stored in one attribute storage field, and the storage space in an attribute storage field is fully utilized, thereby saving storage space.

Moreover, with the rapid development of service business, the user's personalized needs emerge in an inexhaustible variety. Therefore, it is often necessary to open up new personal attributes. In this case, a field needs to be added on the rightmost side of the first row in Table 1 in the existing technology, and the attribute name of the new personal attribute is added to the newly added field. Then a new field needs to be added on the rightmost side of the row of each user ID in Table 1 so that when a user has the new personal attribute, the newly added field on the rightmost side of the row where the user ID is located is filled in with the attribute value of the personal attribute.

However, not all of the users corresponding to the user IDs in Table 1 have the new personal attribute, and thus will not fill the newly added fields on the rightmost side of the row where all the user IDs are located with attribute values, which leads to some empty fields and wasting storage space, more or less.

In addition, in the process of adding new fields to Table 1, it is necessary to lock Table 1, and Table 1 in the locked state cannot be used. When there are a great many user IDs stored in Table 1, that is, there is a large number of rows in Table 1, adding new fields to the rightmost side of the row where all the user IDs are located will consume plenty of time. As a result, Table 1 cannot be used for too much time, resulting in the inability to provide users with accurate services in a long period. However, in the implementation of the present disclosure, even if a new personal attribute is developed, there is no need to allocate a field for the new personal attribute that has been developed, and there is no need to lock the stored personal attributes, so that the users can be provided with accurate services constantly. In addition, there is no need to allocate fields for the new personal attributes that have been developed, and accordingly there is no empty field, thereby alleviating the problem of wasting storage space.

Figure 6:
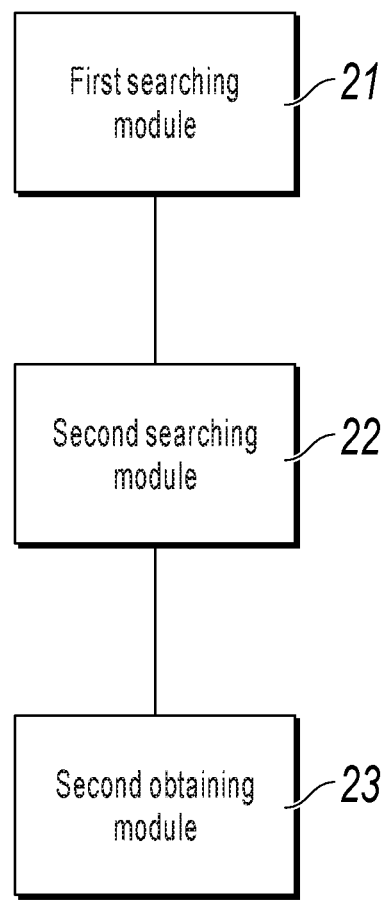
FIG. 6 is a block diagram illustrating a data processing device according to an implementation.

FIG. 6 is a block diagram illustrating a data processing device according to an implementation. Referring to FIG. 6, the device includes the following: a first searching module 21, configured to search, when an acquisition request including a user ID and an attribute ID of a personal attribute is obtained, first correspondences between user IDs and attribute storage fields to determine whether an attribute storage field corresponding to the user ID exists in the first correspondences; a second searching module 22, configured to search, when the attribute storage field corresponding to the user ID exists, the attribute storage field to determine whether an attribute correspondence corresponding to the attribute ID exists in the attribute storage field; and a second obtaining module 23, configured to obtain an attribute value in the attribute correspondence when the attribute correspondence corresponding to the attribute ID exists.

The second searching module 22 includes the following: a first searching unit, configured to search the attribute storage field to determine whether an attribute correspondence including the attribute ID exists in the attribute storage field; and a second determining unit, configured to determine that the attribute correspondence corresponding to the attribute ID exists in the attribute storage field when the attribute correspondence including the attribute ID exists.

The second searching module 22 includes the following: a second obtaining unit, configured to obtain second correspondences between attribute IDs and index IDs; a second searching unit, configured to search the second correspondences for an index ID corresponding to the attribute ID; a third searching unit, configured to search the attribute storage field to determine whether an attribute correspondence including the index ID exists in the attribute storage field; and a third determining unit, configured to determine that the attribute correspondence corresponding to the attribute ID exists in the attribute storage field when the attribute correspondence including the index ID exists.

In the implementation shown in FIG. 6 of the present disclosure, a user ID as well as an attribute ID and an attribute value of at least one personal attribute corresponding to the user ID are obtained. For each of the personal attributes, a target attribute correspondence of the personal attribute is generated based on the attribute ID and the attribute value of the personal attribute. Whether a target attribute storage field corresponding to the user ID exists in stored first correspondences between user IDs and attribute storage fields is determined; and all the target attribute correspondences are stored in the target attribute storage field when the target attribute storage field corresponding to the user ID exists in the first correspondences. Alternatively an attribute storage field corresponding to the user ID is created when no target attribute storage field corresponding to the user ID exists in the first correspondences, and all the target attribute correspondences are stored in the created attribute storage field.

The storage structure in the existing technology is abandoned in the implementation shown in FIG. 1 of the present disclosure. First, there is no empty field, thereby avoiding the problem of wasting storage space for empty fields, and achieving the purpose of saving storage space. In addition, in the existing technology, only one attribute value is stored in each field. However, in the implementation shown in FIG. 6 of the present disclosure, a plurality of attribute correspondences are stored in one attribute storage field, and each attribute correspondence includes an attribute value. Thus, compared with the existing technology, in the implementation shown in FIG. 6 of the present disclosure, a plurality of attribute values are stored in one attribute storage field, and the storage space in an attribute storage field is fully utilized, thereby saving storage space.

Moreover, with the rapid development of service business, the user's personalized needs emerge in an inexhaustible variety. Therefore, it is often necessary to open up new personal attributes. In this case, a field needs to be added on the rightmost side of the first row in Table 1 in the existing technology, and the attribute name of the new personal attribute is added to the newly added field. Then a new field needs to be added on the rightmost side of the row of each user ID in Table 1 so that when a user has the new personal attribute, the newly added field on the rightmost side of the row where the user ID is located is filled in with the attribute value of the personal attribute.

However, in this case, not all of the users corresponding to the user IDs in Table 1 have the new personal attribute, and thus will not fill the newly added fields on the rightmost side of the row where all the user IDs are located with attribute values, which leads to some empty fields and wasting storage space, more or less.

In addition, in the process of adding new fields to Table 1, it is necessary to lock Table 1, and Table 1 in the locked state cannot be used. When there are a great many user IDs stored in Table 1, that is, there is a large number of rows in Table 1, adding new fields to the rightmost side of the row where all the user IDs are located will consume plenty of time. As a result, Table 1 cannot be used for too much time, resulting in the inability to provide users with accurate services in a long period. However, in the implementation shown in FIG. 6 of the present disclosure, even if a new personal attribute is developed, there is no need to allocate a field for the new personal attribute that has been developed, and there is no need to lock the stored personal attributes, so that the users can be provided with accurate services constantly. In addition, there is no need to allocate fields for the new personal attributes that have been developed, and accordingly there is no empty field, thereby alleviating the problem of wasting storage space.

With regard to the device in the above implementations, the specific methods for performing operations by the modules have been described in detail in the implementations relating to the method, and details are omitted here for simplicity A person of ordinary skill in the art can easily figure out another implementation of the present disclosure after thinking over the specification and practicing the present disclosure here. The present application is intended to cover any variations, uses, or adaptations of the present disclosure, and these variations, uses, or adaptations follow the general principles of the present disclosure and include common knowledge or conventional techniques that are not disclosed in the technical field of the present disclosure. The specification and implementations are considered as examples only, with the true scope and spirit of the present disclosure being indicated by the appended claims.

It should be understood that the present disclosure is not limited to the precise structures that have been described above and shown in the drawings, and various modifications and changes can be made without departing from the scope of the present disclosure. The scope of the present disclosure is limited by the appended claims only.

Figure 7:
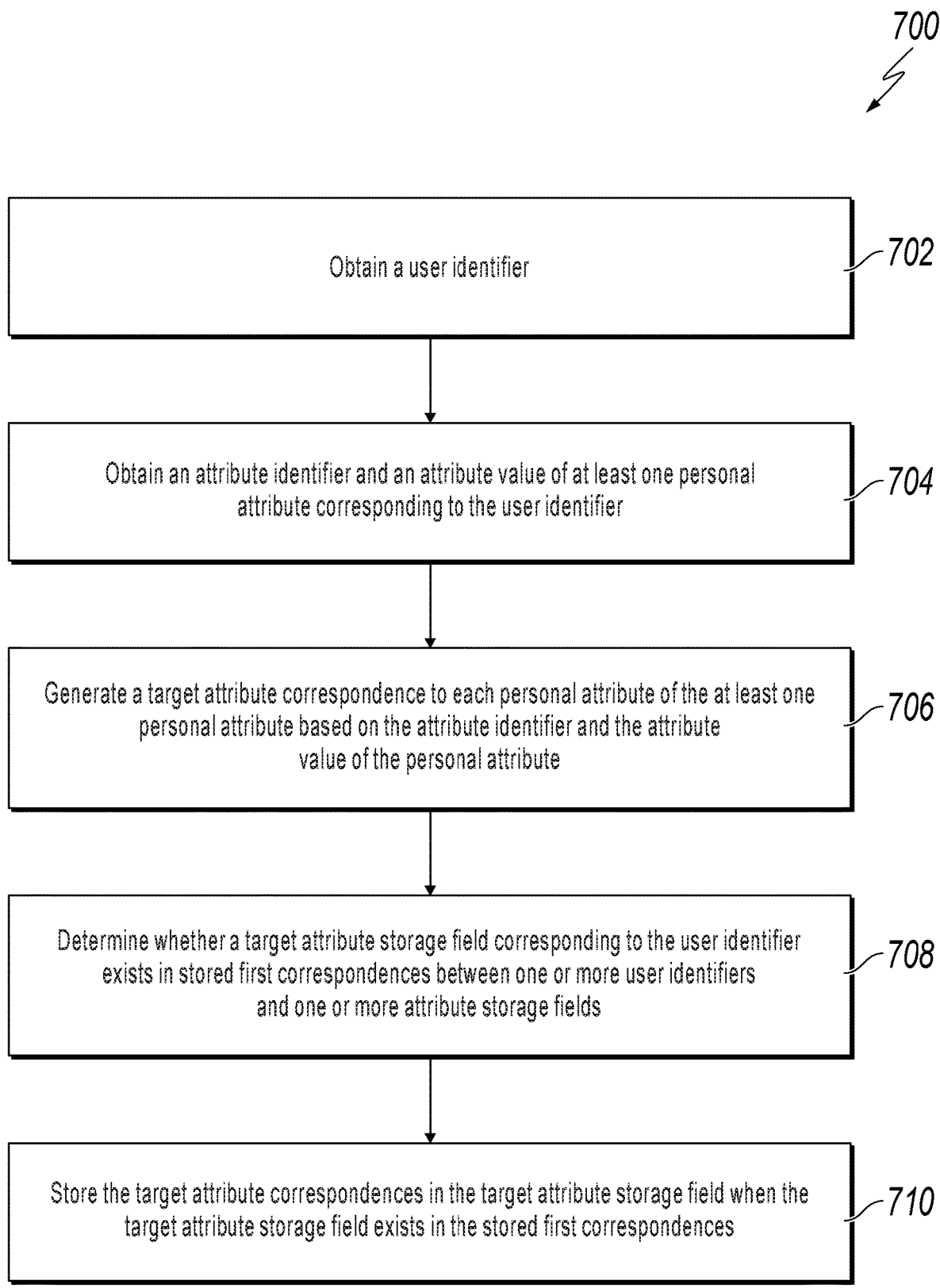
FIG. 7 is a flowchart illustrating an example of a computer-implemented method for efficient storage of user personal attributes for service provisioning, according to an implementation of the present disclosure.

FIG. 7 is a flowchart illustrating an example of a computer-implemented method 700 for efficient storage of user personal attributes for service provisioning, according to an implementation of the present disclosure. For clarity of presentation, the description that follows generally describes method 700 in the context of the other figures in this description. However, it will be understood that method 700 can be performed, for example, by any system, environment, software, and hardware, or a combination of systems, environments, software, and hardware, as appropriate. In some implementations, various steps of method 700 can be run in parallel, in combination, in loops, or in any order.

At 702, a user identifier is obtained. From 702, method 700 proceeds to 704.

At 704, an attribute identifier and an attribute value of at least one personal attribute corresponding to the user identifier is obtained. From 704, method 700 proceeds to 706.

At 706, a target attribute correspondence to each personal attribute of the at least one personal attribute is generated based on the attribute identifier and the attribute value of the personal attribute. In some implementations, generating the target attribute correspondence to each personal attribute of the at least one personal attribute includes establishing a target attribute correspondence between the attribute identifier and the attribute value of the personal attribute. From 706, method 700 proceeds to 708.

At 708, a determination is performed as to whether a target attribute storage field corresponding to the user identifier exists in stored first correspondences between one or more user identifiers and one or more attribute storage fields. From 708, method 700 proceeds to 710.

At 710, when the target attribute storage field exists in the stored first correspondences, the target attribute correspondences are stored in the target attribute storage field. In some implementations, storing the target attribute correspondences in the target attribute storage field includes: 1) determining whether storage space occupied by the target attribute correspondences is less than or equal to idle storage space of the target attribute storage field; and 2) storing the target attribute correspondences in the target attribute storage field when the storage space occupied by all the target attribute correspondences is less than or equal to the idle storage space of the target attribute storage field. In some implementations, when it is determined that the target attribute storage field corresponding to the user identifier does not exist in the stored first correspondences, an attribute storage field corresponding to the user identifier is created and the target attribute correspondences are stored in the created attribute storage field. In some implementations, storing the target attribute correspondences in the created attribute storage field includes: 1) creating at least one new attribute storage field corresponding to the user identifier when the storage space occupied by the target attribute correspondences is greater than an idle storage space of the at least one new target attribute storage field; and 2) storing the target attribute correspondences in the at least one new attribute storage field or a combination of the at least one new target attribute storage field and the at least one new attribute storage field. From 710, method 700 stops.

In some implementations, method 700 further includes: 1) determining a location where the target attribute correspondence is to be stored in the target attribute storage field based on an index identifier in the target attribute correspondence and index identifiers in all target attribute correspondences stored in the target attribute storage field; and 2) storing the target attribute correspondence in the determined location. In some implementations, method 700 further includes: 1) obtaining an acquisition request including the user identifier and the attribute identifier of the at least one personal attribute; 2) searching the stored first correspondences between one or more user identifiers and one or more attribute storage fields to determine whether a particular attribute storage field corresponding to the user identifier exists in the first correspondences; 3) searching the particular attribute storage field to determine whether a target attribute correspondence corresponding to the attribute identifier exists in the particular attribute storage field; and 4) obtaining an attribute value from the target attribute correspondence.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method, comprising:
   obtaining a user identifier;
   obtaining a plurality of personal attributes corresponding to the user identifier, wherein each personal attribute of the plurality of personal attributes comprises a corresponding attribute identifier and a corresponding attribute value associated with the corresponding attribute identifier;
   generating a plurality of target attribute correspondences corresponding to the plurality of personal attributes, wherein each target attribute correspondence of the plurality of target attribute correspondences comprises an attribute identifier of a corresponding personal attribute, an attribute value of the corresponding personal attribute, and a predetermined identifier that connects the attribute identifier of the corresponding personal attribute and the attribute value of the corresponding personal attribute;
   determining whether a target attribute storage field corresponding to the user identifier exists in stored first correspondences between one or more user identifiers and one or more attribute storage fields; and
   in response to determining that the target attribute storage field exists in the stored first correspondences, storing the plurality of target attribute correspondences in the target attribute storage field, including determining whether a quantity of units of storage space occupied by the plurality of target attribute correspondences is less than or equal to a quantity of units of available storage space of the target attribute storage field, wherein a predetermined separator is used to separate adjacent target attribute correspondences, wherein the predetermined identifier is different than the predetermined separator.

2. The computer-implemented method of claim 1, further comprising, in response to determining that the target attribute storage field corresponding to the user identifier does not exist in the stored first correspondences:
   creating the target attribute storage field corresponding to the user identifier; and
   storing the plurality of target attribute correspondences in the target attribute storage field.

3. The computer-implemented method of claim 2, wherein storing the plurality of target attribute correspondences in the target attribute storage field comprises:
   creating at least one new attribute storage field corresponding to the user identifier when a quantity of units of storage space occupied by the plurality of target attribute correspondences is greater than a quantity of units of available storage space of the at least one new attribute storage field, wherein the at least one new attribute storage field is different than the target attribute storage field; and
   storing the plurality of target attribute correspondences in the at least one new attribute storage field or a combination of the target attribute storage field and the at least one new attribute storage field.

4. The computer-implemented method of claim 1, wherein generating the plurality of target attribute correspondences comprises establishing a particular target attribute correspondence between a particular attribute identifier of a particular personal attribute and a particular attribute value of the particular personal attribute.

5. The computer-implemented method of claim 1, wherein storing the plurality of target attribute correspondences in the target attribute storage field comprises:
   storing the plurality of target attribute correspondences in the target attribute storage field when the quantity of units of storage space occupied by the plurality of target attribute correspondences is less than or equal to the quantity of units of available storage space of the target attribute storage field.

6. The computer-implemented method of claim 1, further comprising:
   determining a location where a particular target attribute correspondence of the plurality of target attribute correspondences is to be stored in the target attribute storage field based on an index identifier in the particular target attribute correspondence and index identifiers in an additional plurality of target attribute correspondences stored in the target attribute storage field; and storing the particular target attribute correspondence in the location.

7. The computer-implemented method of claim 1, further comprising:
obtaining an acquisition request comprising the user identifier and a particular attribute identifier of a particular personal attribute of the plurality of personal attributes;
searching the stored first correspondences to determine whether a particular attribute storage field corresponding to the user identifier exists in the stored first correspondences;
searching the particular attribute storage field to determine whether a particular target attribute correspondence corresponding to the particular attribute identifier exists in the particular attribute storage field; and
obtaining a particular attribute value from the particular target attribute correspondence.

8. A non-transitory, computer-readable medium storing one or more instructions executable by a computer system to perform operations comprising:
obtaining a user identifier;
obtaining a plurality of personal attributes corresponding to the user identifier, wherein each personal attribute of the plurality of personal attributes comprises a corresponding attribute identifier and a corresponding attribute value associated with the corresponding attribute identifier;
generating a plurality of target attribute correspondences corresponding to the plurality of personal attributes, wherein each target attribute correspondence of the plurality of target attribute correspondences comprises an attribute identifier of a corresponding personal attribute, an attribute value of the corresponding personal attribute, and a predetermined identifier that connects the attribute identifier of the corresponding personal attribute and the attribute value of the corresponding personal attribute;
determining whether a target attribute storage field corresponding to the user identifier exists in stored first correspondences between one or more user identifiers and one or more attribute storage fields; and
in response to determining that the target attribute storage field exists in the stored first correspondences, storing the plurality of target attribute correspondences in the target attribute storage field, including determining whether a quantity of units of storage space occupied by the plurality of target attribute correspondences is less than or equal to a quantity of units of available storage space of the target attribute storage field, wherein a predetermined separator is used to separate adjacent target attribute correspondences, wherein the predetermined identifier is different than the predetermined separator.

9. The non-transitory, computer-readable medium of claim 8, the operations further comprising, in response to determining that the target attribute storage field corresponding to the user identifier does not exist in the stored first correspondences:
creating the target attribute storage field corresponding to the user identifier; and
storing the plurality of target attribute correspondences in the target attribute storage field.

10. The non-transitory, computer-readable medium of claim 9, wherein storing the plurality of target attribute correspondences in the target attribute storage field comprises:
creating at least one new attribute storage field corresponding to the user identifier when a quantity of units of storage space occupied by the plurality of target attribute correspondences is greater than a quantity of units of available storage space of the at least one new attribute storage field, wherein the at least one new attribute storage field is different than the target attribute storage field; and
storing the plurality of target attribute correspondences in the at least one new attribute storage field or a combination of the target attribute storage field and the at least one new attribute storage field.

11. The non-transitory, computer-readable medium of claim 8, wherein generating the plurality of target attribute correspondences comprises establishing a particular target attribute correspondence between a particular attribute identifier of a particular personal attribute and a particular attribute value of the particular personal attribute.

12. The non-transitory, computer-readable medium of claim 8, wherein storing the target attribute correspondences in the target attribute storage field comprises:
storing the plurality of target attribute correspondences in the target attribute storage field when the quantity of units of storage space occupied by the plurality of target attribute correspondences is less than or equal to the quantity of units of available storage space of the target attribute storage field.

13. The non-transitory, computer-readable medium of claim 8, the operations further comprising:
determining a location where a particular target attribute correspondence of the plurality of target attribute correspondences is to be stored in the target attribute storage field based on an index identifier in the particular target attribute correspondence and index identifiers in an additional plurality of target attribute correspondences stored in the target attribute storage field; and
storing the particular target attribute correspondence in the location.

14. The non-transitory, computer-readable medium of claim 8, the operations further comprising:
obtaining an acquisition request comprising the user identifier and a particular attribute identifier of a particular personal attribute of the plurality of personal attributes;
searching the stored first correspondences to determine whether a particular attribute storage field corresponding to the user identifier exists in the stored first correspondences;
searching the particular attribute storage field to determine whether a particular target attribute correspondence corresponding to the particular attribute identifier exists in the particular attribute storage field; and
obtaining a particular attribute value from the particular target attribute correspondence.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
obtaining a user identifier;
obtaining a plurality of personal attributes corresponding to the user identifier, wherein each personal attribute of the plurality of personal attributes comprises a corresponding attribute identifier and a corresponding attribute value associated with the corresponding attribute identifier;

generating a plurality of target attribute correspondences corresponding to the plurality of personal attributes, wherein each target attribute correspondence of the plurality of target attribute correspondences comprises an attribute identifier of a corresponding personal attribute, an attribute value of the corresponding personal attribute, and a predetermined identifier that connects the attribute identifier of the corresponding personal attribute and the attribute value of the corresponding personal attribute;

determining whether a target attribute storage field corresponding to the user identifier exists in stored first correspondences between one or more user identifiers and one or more attribute storage fields; and in response to determining that the target attribute storage field exists in the stored first correspondences, storing the plurality of target attribute correspondences in the target attribute storage field, including determining whether a quantity of units of storage space occupied by the plurality of target attribute correspondences is less than or equal to a quantity of units of available storage space of the target attribute storage field, wherein a predetermined separator is used to separate adjacent target attribute correspondences, wherein the predetermined identifier is different than the predetermined separator.

16. The computer-implemented system of claim 15, the operations further comprising, in response to determining that the target attribute storage field corresponding to the user identifier does not exist in the stored first correspondences:

creating the target attribute storage field corresponding to the user identifier; and storing the plurality of target attribute correspondences in the target attribute storage field, wherein storing the plurality of target attribute correspondences in the target attribute storage field comprises:

creating at least one new attribute storage field corresponding to the user identifier when a quantity of units of storage space occupied by the plurality of target attribute correspondences is greater than a quantity of units of available storage space of the at least one new attribute storage field, wherein the at least one new attribute storage field is different than the target attribute storage field; and storing the plurality of target attribute correspondences in the at least one new attribute storage field or a combination of the target attribute storage field and the at least one new attribute storage field.

17. The computer-implemented system of claim 15, wherein generating the plurality of target attribute correspondences comprises establishing a particular target attribute correspondence between a particular attribute identifier of a particular personal attribute and a particular attribute value of the particular personal attribute.

18. The computer-implemented system of claim 15, wherein storing the target attribute correspondences in the target attribute storage field comprises:

storing the plurality of target attribute correspondences in the target attribute storage field when the quantity of units of storage space occupied by the plurality of target attribute correspondences is less than or equal to the quantity of units of available storage space of the target attribute storage field.

19. The computer-implemented system of claim 15, the operations further comprising:

determining a location where a particular target attribute correspondence of the plurality of target attribute correspondences is to be stored in the target attribute storage field based on an index identifier in the particular target attribute correspondence and index identifiers in an additional plurality of target attribute correspondences stored in the target attribute storage field; and storing the particular target attribute correspondence in the location.

20. The computer-implemented system of claim 15, the operations further comprising:

obtaining an acquisition request comprising the user identifier and a particular attribute identifier of a particular personal attribute of the plurality of personal attributes;

searching the stored first correspondences to determine whether a particular attribute storage field corresponding to the user identifier exists in the stored first correspondences;

searching the particular attribute storage field to determine whether a particular target attribute correspondence corresponding to the particular attribute identifier exists in the particular attribute storage field; and obtaining a particular attribute value from the particular target attribute correspondence.

* * * * *